United States Patent [19]

Fischer et al.

[11] Patent Number: 5,513,500
[45] Date of Patent: May 7, 1996

[54] SYSTEM FOR COOLING FOOD IN AN AIRPLANE

[75] Inventors: Heinz Fischer, Henstedt-Ulzberg; Juergen Fischer; Thomas Scherer, both of Hamburg, all of Germany

[73] Assignee: Daimler-Benz Aerospace Airbus GmbH, Hamburg, Germany

[21] Appl. No.: 345,910

[22] Filed: Nov. 28, 1994

[30] Foreign Application Priority Data

Nov. 26, 1993 [DE]  Germany .......................... 43 40 317.4

[51] Int. Cl.⁶ ..................................................... B60H 1/32
[52] U.S. Cl. ................................................ 62/239; 62/435
[58] Field of Search .............................. 62/237, 239, 430, 62/435, 438

[56] References Cited

U.S. PATENT DOCUMENTS

| | | | |
|---|---|---|---|
| 2,511,876 | 6/1950 | Protzeller | 62/239 |
| 2,694,537 | 11/1954 | Reichert | 62/237 X |
| 2,779,171 | 1/1957 | Lindenblad | 62/435 |
| 3,216,215 | 11/1965 | Schuett | 62/435 X |
| 3,507,322 | 4/1970 | Tetrick et al. | 62/237 X |
| 3,765,354 | 10/1973 | Gronroos | 114/16 R |
| 4,280,335 | 7/1981 | Perez et al. | 62/435 X |
| 4,660,787 | 4/1987 | Sprenger et al. | 244/118.5 |
| 4,830,096 | 5/1989 | Biagini | 165/41 |
| 4,924,676 | 5/1990 | Maier-Laxhuber et al. | 62/59 |
| 4,969,509 | 11/1990 | Merensky | 165/41 |
| 5,052,472 | 10/1991 | Takahashi et al. | 165/104.33 |

FOREIGN PATENT DOCUMENTS 4105034  8/1992  Germany .

*Primary Examiner*—William E. Tapolcai
*Attorney, Agent, or Firm*—W. G. Fasse; W. F. Fasse

[57] ABSTRACT

A cooling system is provided for cooling food in an aircraft while the food is stored in known catering trolleys that are stowed at prescribed stowage locations, preferably for example at least one on-board galley (3A to 3E) within the aircraft cabin. The cooling system includes at least one central cooling plant (4) located below the cabin floor of the aircraft. Heat exchanger units (9A, 9B, 17A, 17B) are provided in the galleys (3A to 3E). A distribution conduit system, including a supply conduit (5) and a return conduit (6) as well as connector conduits (10A, 10B, 11A, 11B), couples the central cooling plant (4) with the respective heat exchangers (9A, 9B, 17A, 17B) arranged in the galleys (3A to 3E). Connector adapters are provided at various locations along the supply conduit (5) and the return conduit (6), and the connector conduits (10A, 10B, 11A, 11B) include quick connectors that are connectable to the adapters. The galleys may quickly and easily be repositioned as desired within the cabin to achieve different cabin layouts. The heat and noise of the cooling plant is removed from the cabin to an underfloor space, and a more efficient installation and reconfiguration of the system, as well as an overall space and weight saving, is achieved.

19 Claims, 3 Drawing Sheets

SYSTEM FOR COOLING FOOD IN AN AIRPLANE

CROSS-REFERENCE TO RELATED APPLICATIONS

This application is related to commonly owned, copending U.S. application Ser. No. 08/345,903 entitled "APPARATUS FOR COOLING FOOD STUFFS, ESPECIALLY IN AN AIRCRAFT", filed on Nov. 28, 1994, the entirety of which is incorporated herein by reference. This application is also related to U.S. application Ser. No. 08/110,302, filed on Aug. 20, 1993, entitled "REFRIGERATION SYSTEM FOR AN AIRCRAFT", now U.S. Pat. No. 5,369,960, issue date Dec. 6, 1994.

FIELD OF THE INVENTION

The invention relates to a cooling system for cooling food and related catering items in an aircraft, and particularly for cooling such food items stored in generally known catering containers stowed at prescribed locations within the aircraft, preferably at at least two on-board galleys in the aircraft.

BACKGROUND INFORMATION

As is generally known, food and beverages are offered and served to air passengers during flights. The food service items are generally cold-stored in catering transport containers, i.e. so-called trolleys, from which the food items are usually also served. Except during the actual service periods, the food service trolleys are stowed in a galley, and are further cooled by corresponding cooling arrangements. The total number of galley areas or stowage areas for food service trolleys provided in an aircraft is essentially dependent upon the number of passengers and the particular intended utilization of the aircraft, for example, for long intercontinental flights or alternatively for short haul flights. The galleys are typically arranged at various locations within the aircraft cabin in such a manner that the distribution of meals and beverages to passengers can be achieved in the shortest amount of time and with the shortest involved transport distance.

A known arrangement for cooling each individual food service trolley is to have cooling air inlets and outlets on each trolley, which are supplied with cold air produced by a compression air chiller plant, for example. Typically in the known art, an autonomous cooling plant using cold air as a cooling medium and having its own compression cooling machine, such as an air chiller plant, is provided for each individual galley on the aircraft. It is also known to provide the cool air by using heat exchangers in direct thermal communication with the outer skin of the aircraft fuselage to take advantage of the cold temperatures of the environment at cruising altitudes of the aircraft.

Thus, in the known arrangements, the food service trolleys that are to be cooled are stowed in galley areas directly proximate to the cooling plants. Each respective cooling plant and the associated cooling medium conduits for each galley are rigidly and permanently installed in proximity to the respective galley. Such an arrangement entails a great redundant weight and a large space requirement, and produces additional undesirable heat and noise in the aircraft cabin. The prior art does not allow a flexible rearrangement of the galleys within the aircraft cabin and therewith a rapid reconfiguring of the cabin space for various applications of the aircraft due to the fixed and permanent arrangement and high space requirement of the multiple cooling plants.

OBJECTS OF THE INVENTION

In view of the above it is the aim of the invention to achieve the following objects singly or in combination:

to provide a system for cooling food in an aircraft that makes possible the flexible arrangement or rearrangement of galleys within the aircraft cabin, to allow a rapid reconfiguration of the cabin space for various applications of the aircraft;

to provide such a cooling system that reduces the total weight and space requirements and the necessary installation effort relative to the prior art cooling systems;

to provide such a cooling system that avoids generating undesirable heat and noises in the aircraft cabin; and to provide such a cooling system that uses only a single centrally located cooling plant for providing cooling to all of the individual galleys of an aircraft.

SUMMARY OF THE INVENTION

The above objects have been achieved in a cooling system according to the invention, including at least one central cooling plant arranged in an underfloor space of the aircraft, for example in an equipment or cargo hold of the aircraft, a cooling medium distribution system including a supply conduit and a return conduit connected to the central cooling plant, and heat exchanger arrangements provided in the galleys and connected to the supply and return conduits by corresponding connector or tie conduits.

According to the invention it is especially advantageous that a single central cooling plant provides the necessary cooling capacity for all of the galleys in the aircraft. Because only a single central cooling plant must be installed, the installation effort and expense is considerably reduced and a considerable saving of space and weight is achieved in each galley. It is a further advantage that the use of a central cooling plant allows the rapid repositioning or adaptation of the galley locations for any desired change of the cabin layout, so as to flexibly respond to the cabin configurations or layouts desired by the airlines. The worldwide existing cooling trolleys can be further used without change.

The cooling plant is preferably installed outside the passenger cabin, namely below the cabin floor within an equipment or cargo hold. In this arrangement, the excess heat can be rejected overboard, that is to say, to the external environment outside the aircraft. Thus, no additional sources of heat or noise are located in the aircraft cabin itself, which increases the overall flight comfort of the passengers and crew and avoids overloading the existing air conditioning systems and the like.

The distribution conduit system preferably extends along substantially the entire aircraft cabin region and is preferably arranged in the area below the cabin floor. Connection point adapters are preferably arranged at prescribed locations along the distribution conduits so that the connector conduits of each food service galley can be respectively coupled via quick connectors to any desired one of the adapters. These connection point adapters are provided during the initial installation at such desired locations in the supply and return conduits so that several variable connection possibilities are provided for arranging the galleys in several different potential galley configurations. This allows for a flexible arrangement of the galleys and also a rapid reconfiguration of the cabin layout.

In order to rearrange the location of the galleys within the aircraft cabin, it is not necessary to reposition existing coolant conduits or install new coolant conduits. Rather, the quick connectors provided on the connector conduits of each galley can be easily and quickly connected to any respective desired one of the adapters provided in the supply and return conduits so as to achieve a leak-free connection between the galley and the coolant distribution system.

In one preferred embodiment, the distribution conduits are coolant conduits which carry a liquid coolant or cooling medium, preferably a mixture of water and glycol. Such a liquid coolant has a sufficient cooling capacity so that the conduits can have a relatively small diameter, and the heat exchangers provided in the individual galleys can preferably be simple liquid/air heat exchangers. A secondary cooling circuit through the heat exchanger uses a respective blower to drive the cooled air flow. In any one of the various embodiments of the cooling system, at least one pump can be arranged within the distribution conduit system to assure the transport of the coolant or refrigerant within the distribution system.

The cooling plant for providing the cooling performance can comprise any one or a combination of the particular embodiments described below.

A preferred cooling plant is a principally known compressor cooling unit, using a cooling air flow tapped from the external environment for rejecting the condenser heat as shown on FIG. 2. Alternatively, an additional skin heat exchanger in thermal connection with the aircraft fuselage skin can be installed to directly cool the coolant fluid during cruise flight for power saving and redundancy. This addition is also shown on FIG. 2 (dotted lines).

Another embodiment consists of a fluid/air heat exchanger, which is used to cool the liquid coolant by cold air routed from the aircraft air conditioning packs through the heat exchanger, before the pack air is passed back into the cabin air distribution system.

As a further alternative, the cooling plant includes an adsorption cooling system, whereby the supply conduit carries a liquid refrigerant to the heat exchanger of the galley, which is embodied as an evaporator, and the return conduit is a vapor return conduit, which returns the refrigerant vapor to the adsorption system.

BRIEF DESCRIPTION OF THE DRAWINGS

In order that the invention may be clearly understood, it will now be described, by way of example, with reference to the accompanying drawings, wherein.

DETAILED DESCRIPTION OF EXAMPLE EMBODIMENTS AND OF THE BEST MODE OF THE INVENTION

Figure 1:
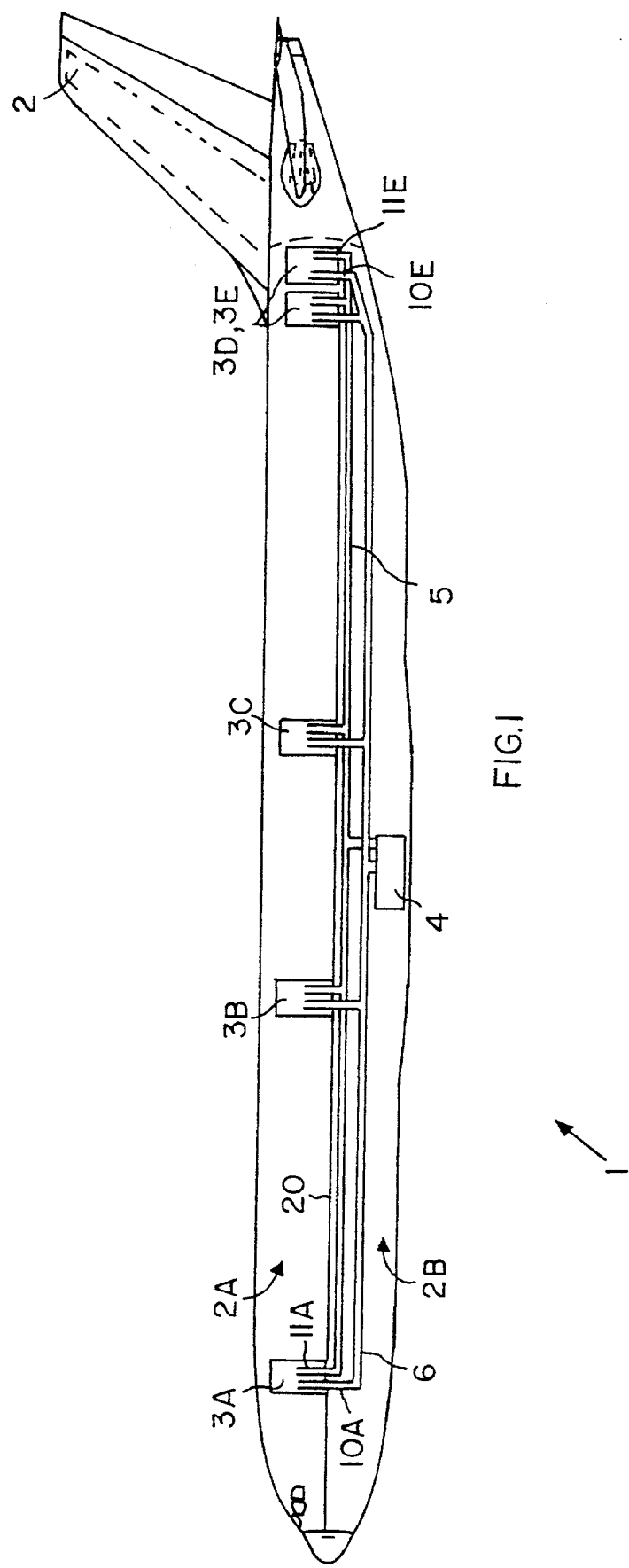
FIG. 1 is a schematic general view of the cooling system for cooling foods in an aircraft, according to the invention.

FIG. 1 schematically shows a general overview of a cooling system 1 for cooling food in an aircraft 2. The food to be cooled is stored in typical known catering containers or so-called trolleys 8A, 8B (see FIG. 2). Except during the passenger service periods, the trolleys are stowed at prescribed stowage locations within the aircraft, preferably at a plurality of on-board galleys 3A to 3E, for example, arranged at various locations within the cabin 2A of the aircraft 2. Preferably, a single central cooling plant 4 is arranged below the cabin floor 20 in an underfloor space such as an equipment or cargo hold 2B. Thus, the central cooling plant 4 is arranged outside of the enclosed cabin space.

The central cooling plant 4 provides cooling energy via a cooling medium to each of the on-board galleys 3A to 3E, through a distribution conduit system including a supply conduit 5 and a return conduit 6. Thus, the supply conduit 5 supplies a cooling medium such as a liquid coolant or a vaporizable refrigerant to the respective cooling loads, where the cooling medium absorbs heat from the food to be cooled. Then the return conduit 6 returns the cooling medium back to the cooling plant 4. The distributor system including the conduits 5 and 6 is preferably arranged to extend along substantially the entire aircraft cabin zone, near the cabin floor 20 and preferably below the floor 20 and thus outside the passenger cabin 2A.

Figure 2:
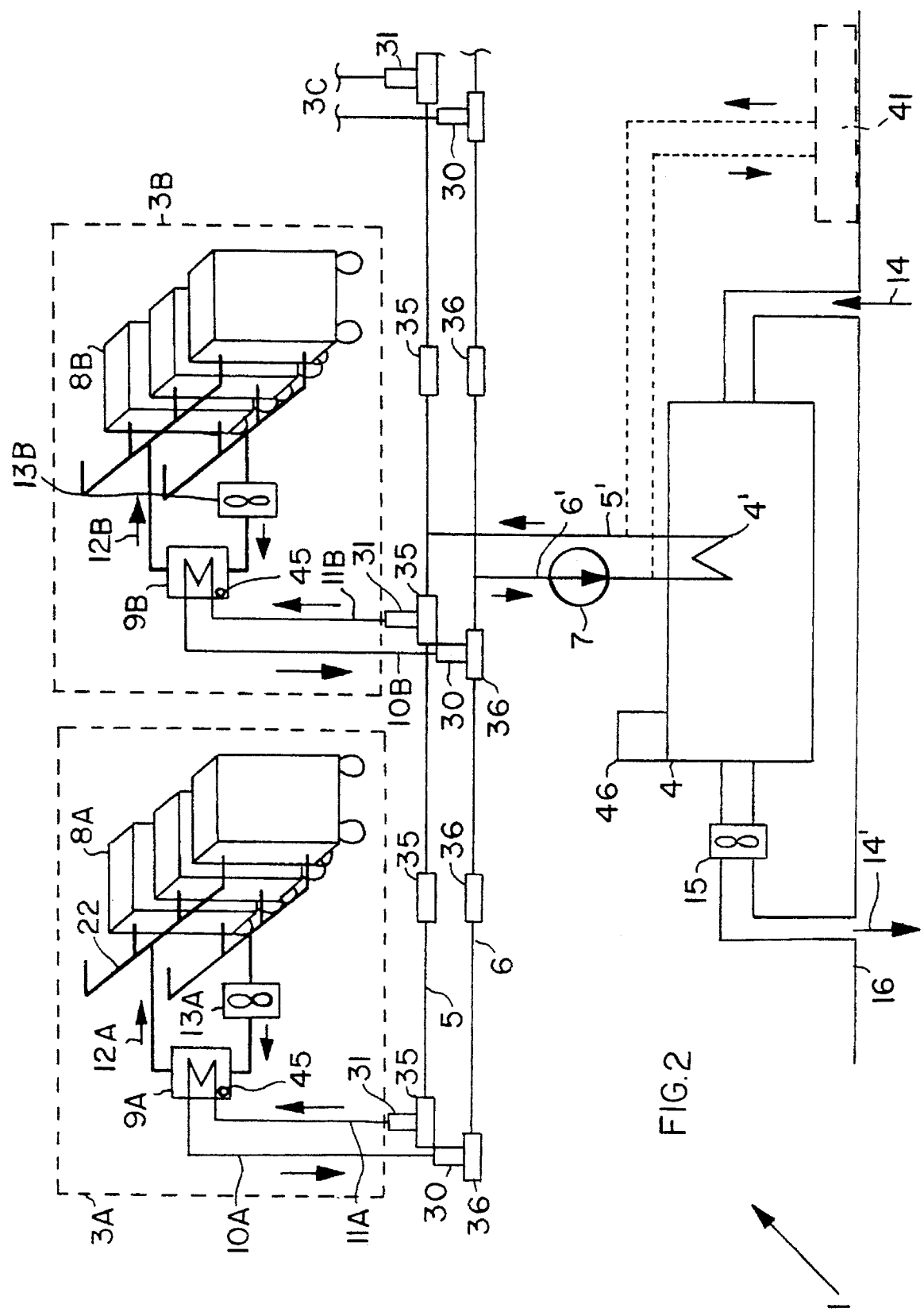
FIG. 2 is a more detailed schematic view of the cooling system according to the invention, using a liquid coolant and a compressor cooling plant.

FIG. 2 shows a particular embodiment of the cooling system 1 according to the invention, using a simple liquid coolant as a cooling medium. The distribution system essentially comprises coolant conduits including a coolant supply conduit 5 and a coolant return conduit 6. The central cooling plant 4 removes heat from the coolant returning in return conduit 6 and then provides the cooled coolant to the supply conduit 5.

Heat exchangers 9A, 9B are respectively arranged in the on-board galleys 3A, 3B. It should be understood that only galleys 3A and 3B are shown in FIG. 2 for the sake of clarity, but the remaining galleys, for example 3C to 3E, have a similar arrangement as that described here with respect to galleys 3A and 3B. Connector conduits 11A, 11B and 10A, 10B respectively connect each heat exchanger 9A, 9B to the supply conduit 5 and the return conduit 6. The liquid coolant is preferably a water/glycol mixture, which has a relatively good heat capacity, whereby the coolant conduits can have a relatively small diameter to advantageously save space and allow convenient routing of the conduits. The supply and return conduits are insulated. When the conduits 5 and 6 are originally installed, connector adapters 35 and 36 are provided at several locations along each conduit 5 and 6. The locations of the adapters 35, 36 correspond to potential desired locations for the on-board galleys in various configurations of the cabin, for example.

Each of the connector conduits 10A, 10B and 11A, 11B has a quick connector 30, 31 provided at the end thereof for connecting the conduits 10A, 10B and 11A, 11B to the adapters 36, 35 provided on the conduits 6 and 5. By using the quick connectors 30, 31 in conjunction with the adapters 36, 35, it is possible to quickly connect a heat exchanger of an on-board galley in a leak-free and repeatably detachable and repositionable manner to the coolant conduits 5 and 6. In order to achieve different cabin layouts, the on-board galleys 3A to 3E can easily be repositioned to any location at which a connector adapter 35, 36 has been previously installed. The particular construction of such adapters and quick connectors is not part of the present invention and is generally understood in the art. It is also possible to use quick connectors that can form a leak-free connection with the supply and return conduits without an intermediate adapter, as is known in the art.

In FIG. 2, the heat exchangers 9A, 9B provided in the galleys 3A, 3B are embodied as liquid/air heat exchangers through which the coolant flows in a primary circuit and air flows in a secondary cooling air circuit 12A, 12B. A blower 13A, 13B drives the air flow of the secondary cooling air circuit 12A, 12B, for example. In each cooling air circuit 12A, 12B, the air is cooled as it passes through the heat exchanger 9A, 9B, and then flows through a supply distributor 22 to the catering trolleys 8A, 8B. There, the cooling air removes heat from the food that is to be cooled. The warmer air is removed from the catering trolleys through a return distributor 23 by the blower 13A, 13B and is circulated back to the heat exchanger 9A, 9B, where the excess heat is removed by the coolant provided by the supply conduit 5 and the connector conduits 11A, 11B. The warmed coolant then returns to the cooling plant 4 via the connector conduits 10A, 10B and the return conduit 6.

If cooling is not necessary in any one of the galleys 3A, 3B, for example if no trolleys 8A, 8B are being stowed in the galley, then the respective blower 13A, 13B can be switched off, to stop the flow of cooling air in the respective cooling air circuit 12A, 12B. Similarly, if fewer than the maximum number of trolleys 8A, 8B are stowed in a galley, the unused outlet(s) or inlet(s) of the cool air supply distributor 22 and return distributor 23 can be closed off in a generally known manner.

FIG. 2 also shows the preferred embodiment of the central cooling plant 4, which comprises a compressor cooling unit as is generally known in the art. Therefore, the cooling unit essentially consists of an evaporator, a condenser, a compressor and an expansion nozzle, using a vaporizable refrigerant in a closed loop. The evaporator of the closed loop refrigerant cycle corresponds to a heat exchanger 4' of the distribution conduit system. Connector conduits 6' and 5' couple the heat exchanger, i.e. evaporator 4' to the respective return conduit 6 and supply conduit 5. A pump 7 circulates the coolant fluid through the exchanger 4' and the distribution conduit system. Cooling air flows through the cooling plant 4 to remove heat from the coolant in the evaporator 4'. After taking up heat from the heat exchanger 4', the cooling air flow is exhausted overboard outside of the aircraft fuselage skin 16 as indicated by exhaust arrow 14'. If need be, the cooling air flow can be driven or supplemented by a blower 15.

As a further source of cooling for the cooling plant 4, a skin heat exchanger 41 may be arranged on the outer skin 16 of the aircraft fuselage as schematically shown in FIG. 2 (dotted lines), and the coolant fluid then passed through this skin heat exchanger, i.e. the connector conduits 5' and 6' coupled to the skin heat exchanger 41 instead to the compressor cooling unit. Such direct external cooling is particularly effective when the aircraft is at cruising altitudes. For this reason, the skin heat exchanger 41 should be used only as a supplemental cooling source, with other cooling sources providing the required cooling when the external temperatures are not sufficiently cold.

In a preferred embodiment, the operation of the cooling plant 4 is controlled by a regulating unit 46. The regulating unit controls the internal refrigeration loop in the cooling plant 4 and the coolant supply temperature in the supply conduit 5 such that the temperature in the galley heat exchangers 9A, 9B is kept just above 32° F. to prevent freezing. Other system parameters may be included in the control, for example, the external cooling air flow through the cooling plant 4 by controlling the blower 15, or the switching of the blower 13A, 13B in the secondary air circuit 12A, 12B in each galley. Temperature sensors 45 are arranged at least in the galley heat exchanger to provide corresponding temperature input signals to the regulating unit 46. For the sake of clarity in FIG. 2, the necessary connections between the sensors, the blowers and the regulating unit are not shown. However, appropriate electric circuits can be provided in a generally known manner to carry the necessary control signals.

Figure 3:
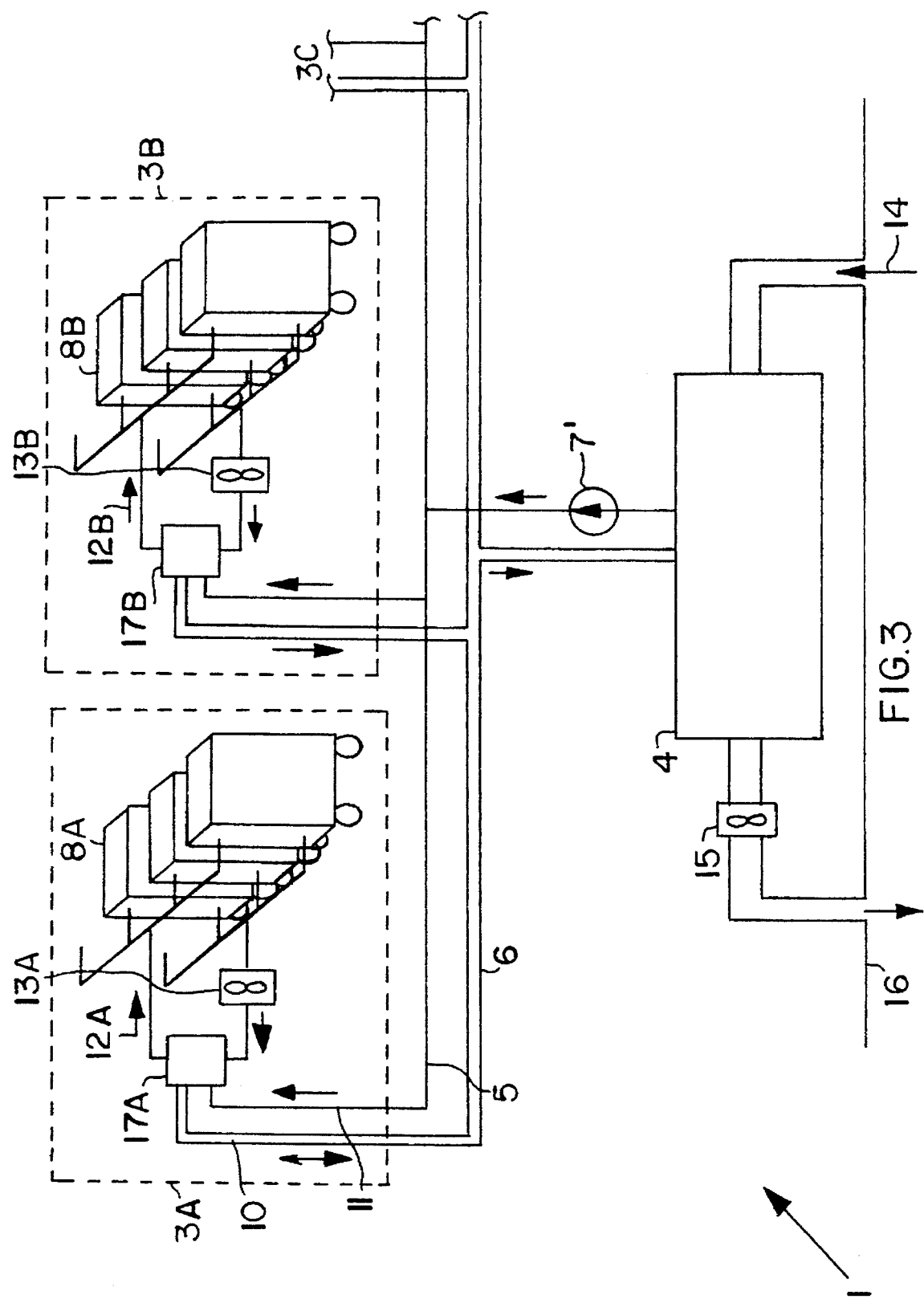
FIG. 3 is a schematic view similar to that of FIG. 2, but showing an absorption cooling system according to the invention, using a refrigerant in a system including an evaporator and a condenser.

FIG. 3 shows an alternative embodiment of the cooling system according to the invention. In this embodiment, the cooling medium is a vaporizable refrigerant, and the cooling plant 4 comprises an adsorption cooling apparatus, using an adsorption medium such as zeolite and water as a cooling medium, for example. The heat exchanger provided in each of the galleys 3A, 3B according to the invention is embodied as an evaporator unit 17A, 17B. Each of the evaporator units 17A, 17B includes an evaporator and an associated through-flow volume control valve as is generally known in the art. The liquid refrigerant or cooling medium is provided to the evaporator 17A, 17B through the liquid medium supply conduit 5 and the connector conduit 11. After it is vaporized in the evaporator unit 17A, 17B, the cooling medium returns as a vapor through the connector conduit 10 and the vapor return conduit 6 to the cooling plant 4. If necessary, the liquid cooling medium can be driven through the conduit system by a pump 7'. The vapor cooling medium returning to the cooling plant 4 is sucked up by the adsorption medium and is then adsorbed thereby.

Through the above described embodiments of the present invention, it is possible to use a central cooling plant in conjunction with the secondary cooling air circuits 12A, 12B that are typically provided in the on-board galleys already existing in an aircraft. The existing cooling trolleys need not to be modified. The cooling energy provided by the central cooling plant is efficiently coupled to the air flow used as a cooling medium in the secondary cooling circuits in each galley without requiring substantial reconstruction of the secondary cooling system already provided in the galleys. According to the invention, the galleys can be relocated to various desired positions within the aircraft cabin to achieve different cabin configurations or layouts. Preferably, the cooling plant operates without CFCs to achieve environmental advantages.

Although the invention has been described with reference to specific example embodiments, it will be appreciated that it is intended to cover all modifications and equivalents within the scope of the appended claims.

What is claimed is:

1. A cooling system for cooling food stored in portable storage containers that are stowed in stowage locations in two or more galleys within a passenger cabin of a pressurized aircraft, the aircraft having a fuselage enclosing the passenger cabin and a hold and a cabin floor arranged within said fuselage, said cooling system comprising at least one central cooling plant arranged in said aircraft below said cabin floor outside said passenger cabin, at least one heat exchanger arranged external to said storage containers at each of said stowage locations, a cooling medium, and a cooling medium distribution conduit system connecting said cooling plant with said heat exchangers, wherein said conduit system includes a supply conduit and a return conduit each connected with said cooling plant, and connector conduits connecting said heat exchangers with said supply and return conduits.

2. The cooling system of claim 1, comprising only one said cooling plant.

3. The cooling system of claim 1, wherein said supply and return conduits are arranged below said cabin floor and extend over substantially the entire length of said cabin.

4. The cooling system of claim 1, further comprising respective quick connectors provided on respective ones of said connector conduits and adapted to couple said respective connector conduit to one of said return and supply conduits at one of a plurality of coupling locations along said return conduit and said supply conduit, and comprising connector adapters provided at said plurality of coupling locations along said return conduit and said supply conduit, and wherein said quick connectors are adapted to couple said connector conduits to said adapters.

5. The cooling system of claim 1, wherein said cooling medium is a liquid coolant, and said conduits of said distribution conduit system are liquid coolant conduits.

6. The cooling system of claim 1, wherein said cooling medium is a vaporizable refrigerant, said supply conduit is a liquid refrigerant supply conduit, said return conduit is a vapor refrigerant return conduit, and said heat exchanger is an evaporator.

7. The cooling system of claim 1, wherein said distribution conduit system further comprises a pump adapted to convey said cooling medium through said distribution conduit system.

8. The cooling system of claim 1, wherein said cooling plant comprises a compression cooling plant.

9. The cooling system of claim 1, wherein said cooling plant comprises a fuselage skin heat exchanger arranged on said fuselage.

10. The cooling system of claim 1, wherein said cooling plant comprises a liquid/air heat exchanger adapted to be cooled by a primary cooling air flow, wherein said aircraft further includes air conditioning packs, and wherein said primary cooling air flow is a cooled air flow provided by said air conditioning packs.

11. The cooling system of claim 1, wherein said cooling plant comprises an adsorption cooling apparatus.

12. The cooling system of claim 6, wherein said cooling plant comprises an adsorption cooling apparatus.

13. The cooling system of claim 5, wherein said liquid coolant is a water/glycol mixture.

14. The cooling system of claim 4, wherein the number of said coupling locations along said conduits is greater than the number of said galleys, and wherein said quick connectors removably couple said connector conduits to said adapters to allow the flexible relocation of said galleys within said cabin.

15. The cooling system of claim 1, further comprising a respective closed-loop secondary cooling air circuit including air ducts arranged at each of said stowage locations and connecting said heat exchangers with said storage containers to circulate air respectively in a closed loop through one of said heat exchangers and through at least one of said storage containers.

16. The cooling system of claim 15, wherein said closed-loop secondary cooling air circuit further includes a blower to drive said circulation of air in said closed loop.

17. The cooling system of claim 1, wherein said heat exchangers are connected parallel to each other to said conduits.

18. The cooling system of claim 1, further comprising an air duct system connecting a plurality of said storage containers in parallel to each other to one of said heat exchangers to form a closed airflow loop through said heat exchanger, said air duct system and said plurality of said storage containers.

19. The cooling system of claim 1, wherein said portable storage containers are at no time connected hydraulically to said distribution conduit system.

* * * * *